United States Patent
Yoshida et al.

(10) Patent No.: US 7,266,649 B2
(45) Date of Patent: Sep. 4, 2007

(54) STORAGE APPARATUS AND AREA ALLOCATION METHOD

(75) Inventors: Hideki Yoshida, Tokyo (JP); Tatsunori Kanai, Kanagawa-ken (JP); Nobuo Sakiyama, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 492 days.

(21) Appl. No.: 10/779,738

(22) Filed: Feb. 18, 2004

(65) Prior Publication Data

US 2004/0162953 A1  Aug. 19, 2004

(30) Foreign Application Priority Data

Feb. 19, 2003  (JP) ............................ P2003-041486

(51) Int. Cl.
*G06F 12/00* (2006.01)
(52) U.S. Cl. ...................................... 711/153; 711/170
(58) Field of Classification Search ................. 711/153, 711/170
See application file for complete search history.

(56) References Cited

U.S. PATENT DOCUMENTS

| | | | |
|---|---|---|---|
| 7,080,072 B1* | 7/2006 | Sinclair ........................... | 707/6 |
| 2002/0138559 A1* | 9/2002 | Ulrich et al. ................ | 709/203 |
| 2003/0004975 A1* | 1/2003 | Nakano et al. .............. | 707/200 |
| 2003/0074348 A1* | 4/2003 | Sinclair et al. ................ | 707/2 |
| 2003/0097533 A1 | 5/2003 | Maeda et al. | |
| 2003/0140051 A1* | 7/2003 | Fujiwara et al. ............ | 707/100 |
| 2004/0205109 A1* | 10/2004 | Hara et al. .................. | 709/201 |
| 2005/0015566 A1* | 1/2005 | Zohar et al. ................ | 711/203 |

OTHER PUBLICATIONS

Dabek, F. et al., "Wide-Area Cooperative Storage with CFS", ACM SOP '01, 14 pages, (Oct. 2001).
Ratnasamy, S. et al., "A Scalable Content-Addressable Network", ACM SIGCOMM '01, pp. 1-14, (2001).
Yoshida, H. et al., "File Management Apparatus And Method", U.S. Appl. No. 10/639,578, filed Aug. 13, 2003.

* cited by examiner

*Primary Examiner*—Pierre Bataille
*Assistant Examiner*—Sheng-Jen Tsai
(74) *Attorney, Agent, or Firm*—Finnegan, Henderson, Farabow, Garrett & Dunner, L.L.P.

(57) ABSTRACT

A file memory stores data corresponding to identifiers of an allocated area in an identifier space. A first memory stores a basis position of the allocated area in the identifier space. A second memory stores a weight of the storage apparatus as a performance degree. A first decision unit decides a space width to divisionally allocate the identifier space with another storage apparatus by using the weight and a weight of another storage apparatus. Another storage apparatus allocates a neighboring area of the allocated area in the identifier space. A second decision unit decides the allocated area of an area between the basis position and a basis position of the neighboring area in the identifier space by using the space width.

9 Claims, 8 Drawing Sheets

STORAGE APPARATUS AND AREA ALLOCATION METHOD

CROSS-REFERENCE TO RELATED APPLICATIONS

This application is based upon and claims the benefit of priority from the prior Japanese Patent Application P2003-041486, filed on Feb. 19, 2003; the entire contents of which are incorporated herein by reference.

FIELD OF THE INVENTION

The present invention relates to a storage apparatus and an area allocation method for determining a self-node's allocated area in identifier space as an object of a distributed storage system.

BACKGROUND OF THE INVENTION

Recently, grid computing to allocate processing by a computer distributively located on a network is developed. Furthermore, from a view point of request to cope with a disaster, a distributed storage system realizes virtual storage by distributively locating many storage nodes on a wide area network.

In such a system, a number of storage nodes composing the system frequently increases or reduces by an extension or an accident of the system. Accordingly, it is not realistic that a user individually assigns a file system or a file to the storage by hand-operation. Furthermore, in a system is which assignment of the file to a storage node by setting a server, occurrence of accident and concentration of load of the server affects the system. Accordingly, there is a need to automatically assign files to the storage node distributively without centralized control.

In order to solve this problem, various distributed storage systems are developed as follows.

CFS (Wide-area cooperative storage with CFS, Frank Dabek, M. Frans Kaashoek, David Karger, Robert Morris, and Ion Stoica, 18th ACM Symposium on Operating Systems Principles (SOSP '01), October 2001)

CAN (A Scalable Content-Addressable Network, Sylvia Ratnasamy, Paul Francis, Mark Handley, Richard Karp and Scott Shenker, ACM SIGCOMM 2001)

In these systems, a node ID (identifier) is determined by applying a hash function to an address of the storage node. Briefly, the storage node is mapped (mapping) onto a space of file ID by using the node ID. A file is assigned to a storage node of which a node ID is nearest to a file ID of the file in the space.

In this method, which storage node to store the file can be determined by the storage node if the storage node has a list of node IDs of other storage nodes. Accordingly, a server centrally controlling assignment of the file is not necessary and an individual arrangement for each file assignment is not necessary between the storage nodes. In the case of adding or deleting a storage node, an address of the storage node is informed to other storage nodes only. As a result, a communication quantity between storage nodes reduces and a concurrency of processing improves.

In the case of adding (participating) a new storage node, the new storage node allocates a part of a hash space. On the other hand, another storage node previously allocates an area including the part of the hash space (Hereinafter, another storage node is called a neighboring storage node). Accordingly, it is necessary to divide the area into two parts between the new storage node and the neighboring storage node. Conversely, in the case of deleting (removing) a storage node, an area allocated by the storage node is divided into two parts and two neighboring storage nodes on both sides of the storage node respectively allocated the two parts.

In order not to concentrate files on a predetermined storage node, file IDs should be uniformly distributed in a file ID space (The file ID space is the same as the hash space). Accordingly, a file ID is determined using a hash function. As an argument of the hash function, a file name or content data of the file is used. The file may be divided into a block unit and located as the block unit in the storage node as shown in "CFS". Alternatively, all of the file may be located in the storage node as shown in "CAN".

However, in assignment of the file to the storage node by the hash function, an expected value of an area assigned to each storage node is equal for all storage nodes. Accordingly, if a storage capacity, calculation ability or network speed is different for each storage node, problems occur. For example, even if a storage node of large capacity includes a remained capacity, another storage node of small capacity is short of capacity. As a result, the system as a whole cannot store the files. Furthermore, if I/O of a proper quantity for a storage node of high calculation ability is requested for another storage node of low calculation ability, the response speed from another storage node falls. In this way, in the case of putting the distributed storage system to practical use, these problems occur.

In the CFS, in order to avoid this problem, it is supposed that a storage node of large capacity is virtually corresponded to a plurality of virtual nodes. Certainly, if a large capacity of the storage node is several times as a small capacity of another storage node, the storage node of large capacity may be divided into several units. However, if a capacity is largely different between storage nodes, for example, if a large capacity of the storage node is several thousand times a small capacity of another storage node, the storage node of large capacity should be divided into several thousand units of virtual nodes. In this case, overhead to control each virtual node is a problem. Furthermore, if average capacity of storage node changes by improvement of disk technique, how a unit of the virtual node is adjusted is a problem. Accordingly, it is insufficient for the virtual node to cope with variety of capacity.

In this case, the distributed storage system in which all files are located on each storage node was explained. However, in a distributed storage system in which the file is located on the storage node by unit of block, the same problem occurs. Concretely, even if a pair of a file name and a block number is managed as a block name, the same problem occurs.

SUMMARY OF THE INVENTION

The present invention is directed to a storage apparatus and an area allocation method for effectively determining the allocated area of each node in the identifier space as the object of the distributed storage system.

According to an aspect of the present invention, there is provided a storage apparatus used in a distributed storage system, comprising: a file memory to store data corresponding to identifiers of an allocated area in an identifier space; a first memory to store a basis position of the allocated area in the identifier space; a second memory to store a weight of the storage apparatus as a performance degree; a first decision unit configured to decide a space width to divisionally allocate the identifier space with another storage apparatus by using the weight and a weight of the another storage apparatus, the another storage apparatus allocation a neighboring area of the allocated area in the identifier space; and a second decision unit configured to decide the allocated area of an area between the basis position and a basis position of the neighboring in the identifier space by using the space width.

According to another aspect of the present invention, there is also provided an area allocation method in a storage apparatus, comprising: storing data corresponding to identifiers of an allocated area in an identifier space; storing a basis position of the allocated area in the identifier space; storing a weight of the storage apparatus as a performance degree; deciding a space width to divisionally allocate the identifier space with another storage apparatus by using the weight and a weight of the another storage apparatus, the another storage apparatus allocating a neighboring area of the allocated area in the identifier space; and deciding the allocated area of an area between the basis position and a basis position of the neighboring area in the identifier space by using the space width.

According to still another aspect of the present invention, there is also provided a computer program product, comprising: a computer readable program code embodied in said product for causing a computer to allocate an area in a storage apparatus, said computer readable program code comprising: a first program code to store data corresponding to identifiers of an allocated area in an identifier space; a second program code to store a basis position of the allocated area in the identifier space; a third program code to store a weight of the storage apparatus as a performance degree; a fourth program code to decide a space width to divisionally allocate the identifier space with another storage apparatus by using the weight and a weight of the another storage apparatus, the another storage apparatus allocating a neighboring area of the allocated area in the identifier space; and a fifth program code to decide the allocated area of an area between the basis position and a basis position of the neighboring area in the identifier space by using the space width.

DETAILED DESCRIPTION OF THE EMBODIMENTS

Hereinafter, various embodiments of the present invention will be explained by referring to the drawings.

The First Embodiment

Figure 1:
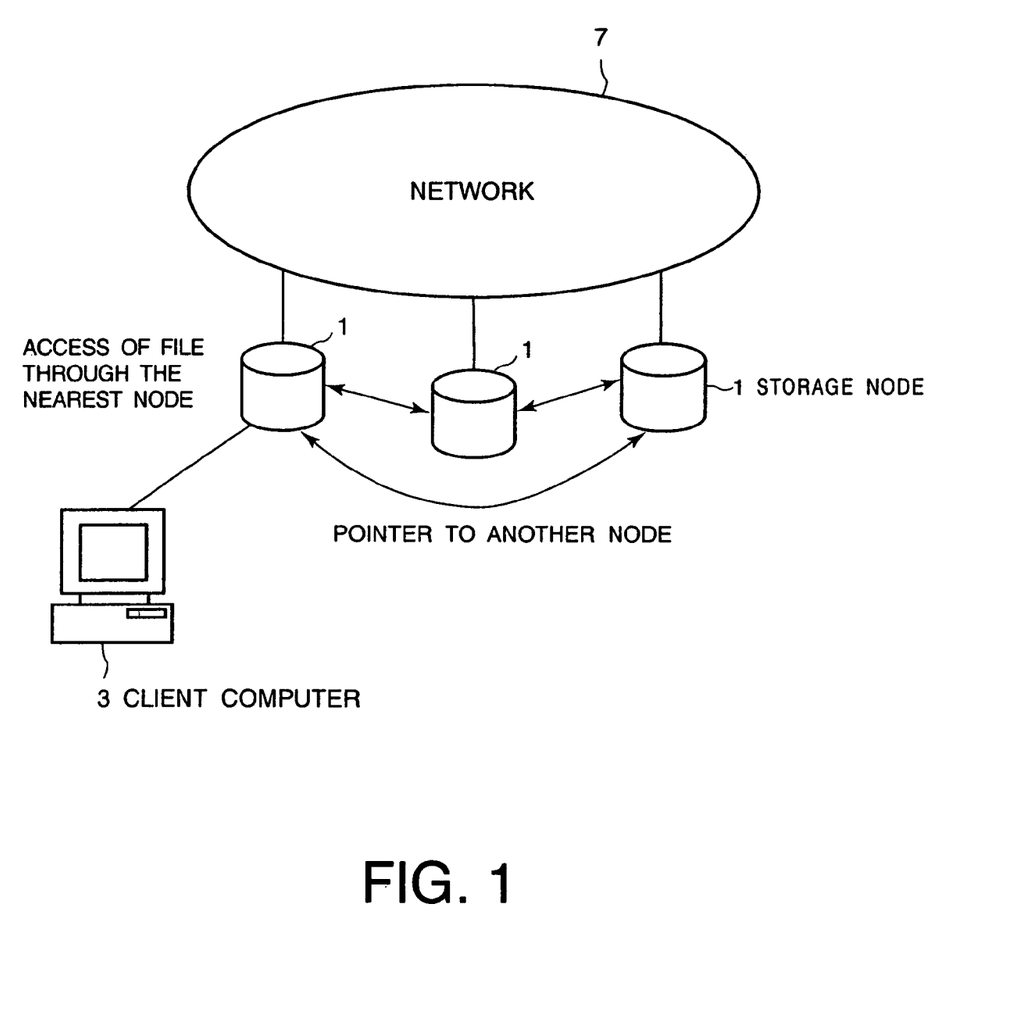
FIG. 1 is a block diagram of components of a distributed storage system according to the present invention.

FIG. 1 is a block diagram of the distributed storage system according to the first embodiment of the present invention. In FIG. 1, the distributed storage system includes a storage node 1, a client computer 3, and a network 7. FIG. 1 shows three units of the storage nodes composing the distributed storage system. This is one example and a number of units of the storage nodes may be arbitrarily set. Furthermore, FIG. 1 shows one group of the distributed storage system (one group of the storage nodes). This is also one example and a plurality of groups may exist. In this case, each storage node may alternatively belong to one group or a plurality of groups. Furthermore, FIG. 1 shows one client computer. This is one example and a plurality of client computers may exist.

In the distributed storage system of the first embodiment, each storage node includes a weight. In the case of assigning the hash space to correspond a file with the storage node, the hash space is divided by a width in proportion to the weight of each storage node. In the case that both edges exist in the hash space, two storage nodes take charge of the both edges. The two storage nodes respectively have one neighboring storage node. Each storage node except for the two storage nodes respectively has two neighboring storage nodes (existing on both side of each storage node). Furthermore, in the case of forming the hash space as a loop shape by connecting both edges of the hash space, each storage node respectively has two neighboring storage nodes.

As the hash function, a function of which bit length is sufficiently long and by which a uniform assignment can be executed is desired. For example, the hash function "SHA-1" can be adopted. The hash space is represented as an integral number of "b" bits ($0 \sim 2^b - 1$). (In the case of "SHA-1", "b"=160)

In the first embodiment, a plurality of storage nodes 1 distributively located on the network 7 composes one group of storage nodes (distributed storage system). As mentioned-above, one storage node can belong to a plurality of groups of storage nodes. In this case, the hash space is independently managed by each group of storage nodes.

Each storage node 1 has an address used for communication between storage nodes. A node ID (identifier) of each storage node 1 is a value applied by the hash function to the address of the storage node. Hereinafter, IP address is explained as one example of the address. Processing may be explained in relation to one storage node, sometimes referred to as a self-node to distinguish nodes other than the one storage node.

A storage node 1 belonging to a group of storage nodes may collect and store addresses of other storage nodes belonging to the group in addition to the address of the storage node 1. However, if each storage node 1 stores all addresses of other storage nodes, problems of communication quantity and processing time occur for increase and decrease of the storage node. Accordingly, in addition to its own the address, the storage node 1 may collect and store addresses of only a part of the storage nodes belonging to the same group. The part of storage nodes satisfies a predetermined condition. For example, for each storage node 1, an address of another storage node neighboring self-node 1 in the hash space and the addresses of other storage nodes taking charge of several points in the hash space may be stored. Concretely, the several points are determined by respectively adding "1, 2, 4, 8, . . . , $2^{b-1}$) to the node ID (a value applied the hash function to the address) of the self-node. By utilizing these addresses, other storage nodes taking charge of arbitrary point in the hash space can be searched using an inquiry for other nodes of maximum "b" units.

Figure 2:
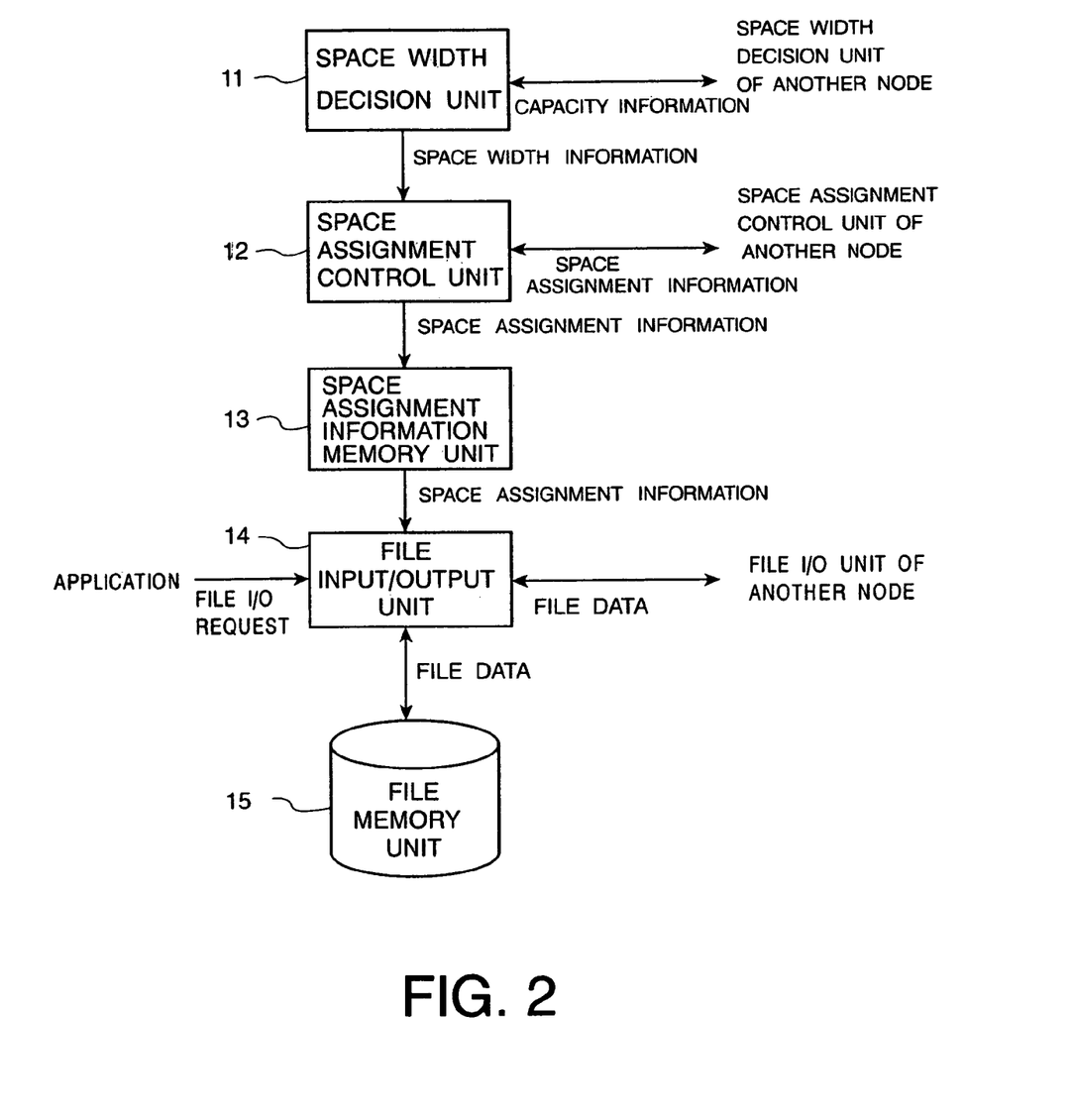
FIG. 2 is a block diagram of components of a storage node in the distributed storage system according to the present invention.

FIG. 2 is a block diagram of internal components of the storage node 1 of the first embodiment. As shown in FIG. 2, the storage node 1 includes a space width decision unit 11, a space assignment control unit 12, a space assignment information memory unit 13, a file input/output unit 14 and a file memory unit 15. Concretely, the space width decision unit 11, the space assignment control unit 12 and the space assignment information memory unit 13, execute decision and management of space assignment. The file input/output unit 14 executes input/output of file based on the space assignment. The file memory unit 15 stores a file corresponding to the allocation area of the storage node 1 in the hash space. Furthermore, the storage node 1 includes a memory (not shown in FIG. 2) to store information related to the storage node 1. For example, the information is at least one of the addresses, the node ID, and the weight of the self-node.

As used herein, those skilled in the art will understand that the term "unit" is broadly defined as a processing device (such as a server, a computer, a microprocessor, a microcontroller, a specifically programmed logic circuit, an application specific integrated circuit, a discrete circuit, etc.) that provides the described communication and functionally desired. While such a hardware-based implementation is clearly described and contemplated, those skilled in the art will quickly recognize that a "unit" may alternatively be implemented as a software module that works in combination with such a processing device. In addition, one processing device may comprise one or more than one unit. Similarly, "a memory" may refer to one physical memory or several "memories" may be configured on one physical unit.

Depending on the implementation constraints, such a software module or processing device may be used to implement more than one "unit" as disclosed and described herein. Those skilled in the art will be familiar with particular and conventional hardware suitable for use when implementing an embodiment of the present invention with a computer or other processing device. Likewise, those skilled in the art will be familiar with the availability of different kinds of software and programming approaches suitable for implementing one or more "units" as one or more software modules.

Figure 3:
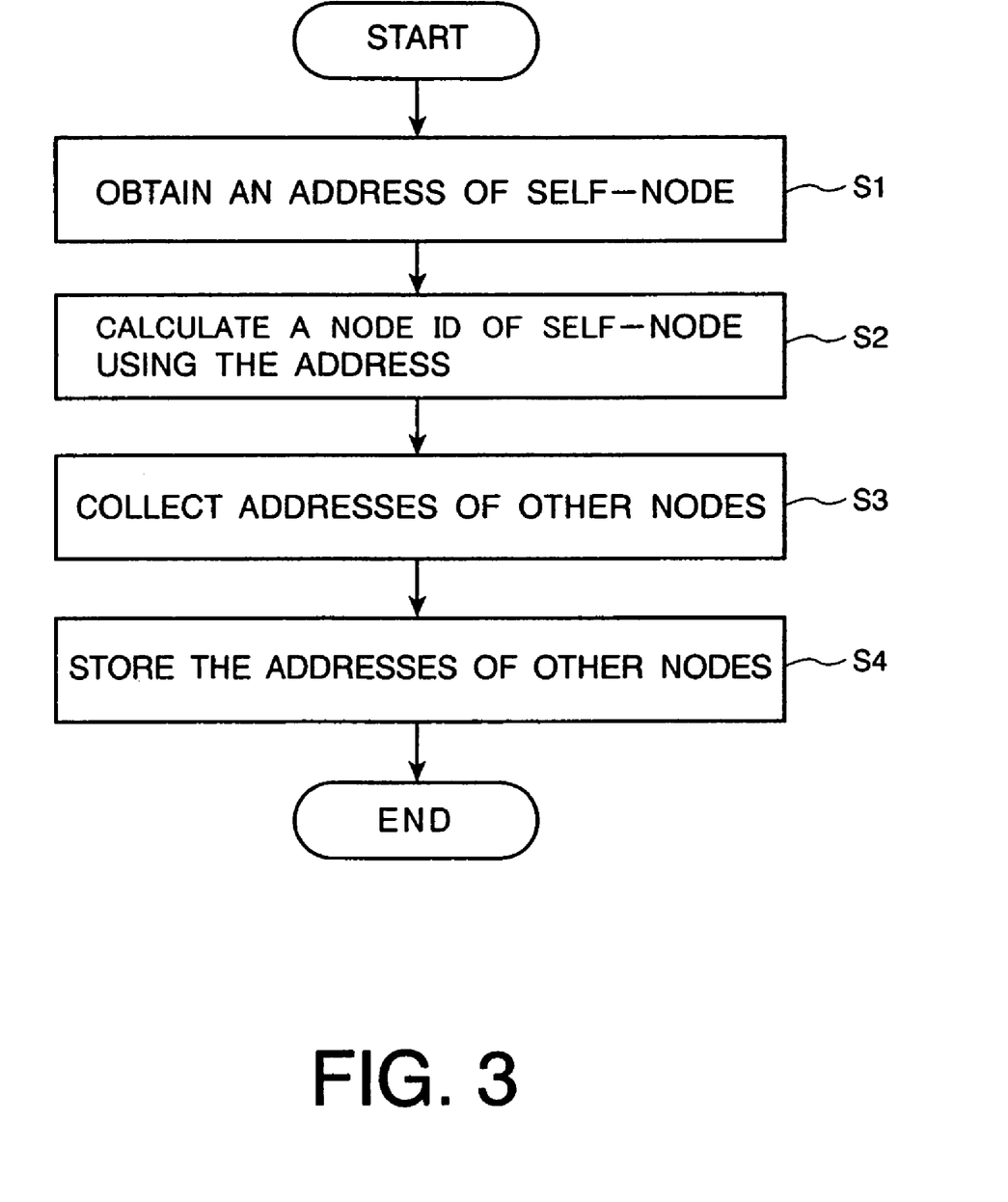
FIG. 3 is a flow chart of processing of participation of the storage node in the distributed storage system according to the present invention.

FIG. 3 is a flow chart of processing of participation of a storage node 1 into the distributed storage system. First, the storage node 1 obtains IP address of self-node (S1). As a method for obtaining IP address, the obtaining method for normal IP network can be utilized. For example, a manager may suitably select one from IP addresses unused on the subnet and input the one IP address to the storage node 1 (hereinafter, new storage node) by hand-operation. Alternatively, "DHCP" server may automatically select one from IP addresses pooled and inform it to the new storage node 1 by "DHCP" protocol. As mentioned-above, the new storage node 1 determines the node ID of the self-node by applying the hash function to the address (input or informed) of the self-node (S2). Next, the new storage node 1 obtains an IP address of an arbitrary other storage node (For example, one) in the group of storage nodes, and informs the IP address to the space assignment control unit 12. In order to obtain the address of the other storage node, any method may be used. For example, the manager may arbitrarily select the other storage node (For example, one) and input the IP address of the other storage node to the new storage node 1 by hand-operation. Alternatively, if the other storage node 1 neighbors on the new storage node 1, the IP address of the other storage node can be automatically informed to the new storage node 1 by an option of DHCP or a broadcast. By using the IP address of the other storage node, the space assignment control unit 12 of the new storage node 1 suitably connects to the other storage node (the space assignment control unit 12), and inquires and collects IP addresses of all or a part of other storage nodes belonging to the same group as the self-node (S3). In the case of storing the IP address of a part of other storage nodes, for example, in addition to an address of a neighboring storage node, an address of each storage node 1 taking change of each point which "1, 2, 4, 8, . . . , $2^{b-1}$," are respectively added to the node ID of the self-node. In this way, the addresses of the other storage nodes are stored in the space assignment information memory unit 13 (S4).

Hereinafter, a method for each storage node to divide the hash space is explained by referring to FIG. 4. In the case that two storage nodes neighbors on both sides of one storage node, the following processing is executed for each of the two storage nodes. Furthermore, in the case that the following processing is first executed, it may be continually executed from S4 of FIG. 3, it may be executed at a first timing of receiving an I/O request from the client computer, or it may be executed at another suitable timing. Alternatively, in the case of changing a weight of self-node, in the case of changing a weight of neighboring node, or in the case of changing the neighboring node by increase or decrease of units of the storage nodes, the following processing may be executed.

The space width decision unit 11 of the storage node 1 connects the neighboring storage node 1 (the space width decision unit 11) by the address of the neighboring storage node obtained from the space assignment control unit 12, sends the weight of self-node to the neighboring storage node 1, and obtains the weight of the neighboring storage node 1. For example, as the weight, memory capacity, calculation ability, circuit speed, or some suitable combination of these may be used. In the following explanation, the memory capacity is used as the weight.

Assume that a weight of self-node s is V[s] and a weight of neighboring node u is V[u]. A relative space width W of the self-node s is represented as follows.

$$W=V[s]/(V[s]+V[u]) \quad (1)$$

After determining the space width W, the space width decision unit 11 sends the space width W to the space assignment control unit 12. The space assignment control unit 12 divides an area of the hash space between the self-node s and the neighboring node u by using the space width information W. The area between the self-node s and the neighboring node u is predetermined in the hash space. One edge point of the area is determined by applying the hash function to the address of the self-node s. The other edge point of the area is determined by applying the hash function to the address of the neighboring node u. In this case, assume that the hash function is h( ), the address of the self-node s is A[s] and the address of the neighboring node u is A[u]. A boundary point $h_1$ between the self-node s and the neighboring node u in the hash space is represented as follows.

$$h_1 = h(A[u]) * W + h(A[s]) * (1-W) \quad (2)$$

$$h_1 - h(A[u]) : h(A[s]) - h_1 = V[u] : V[s]$$

Figure 4:
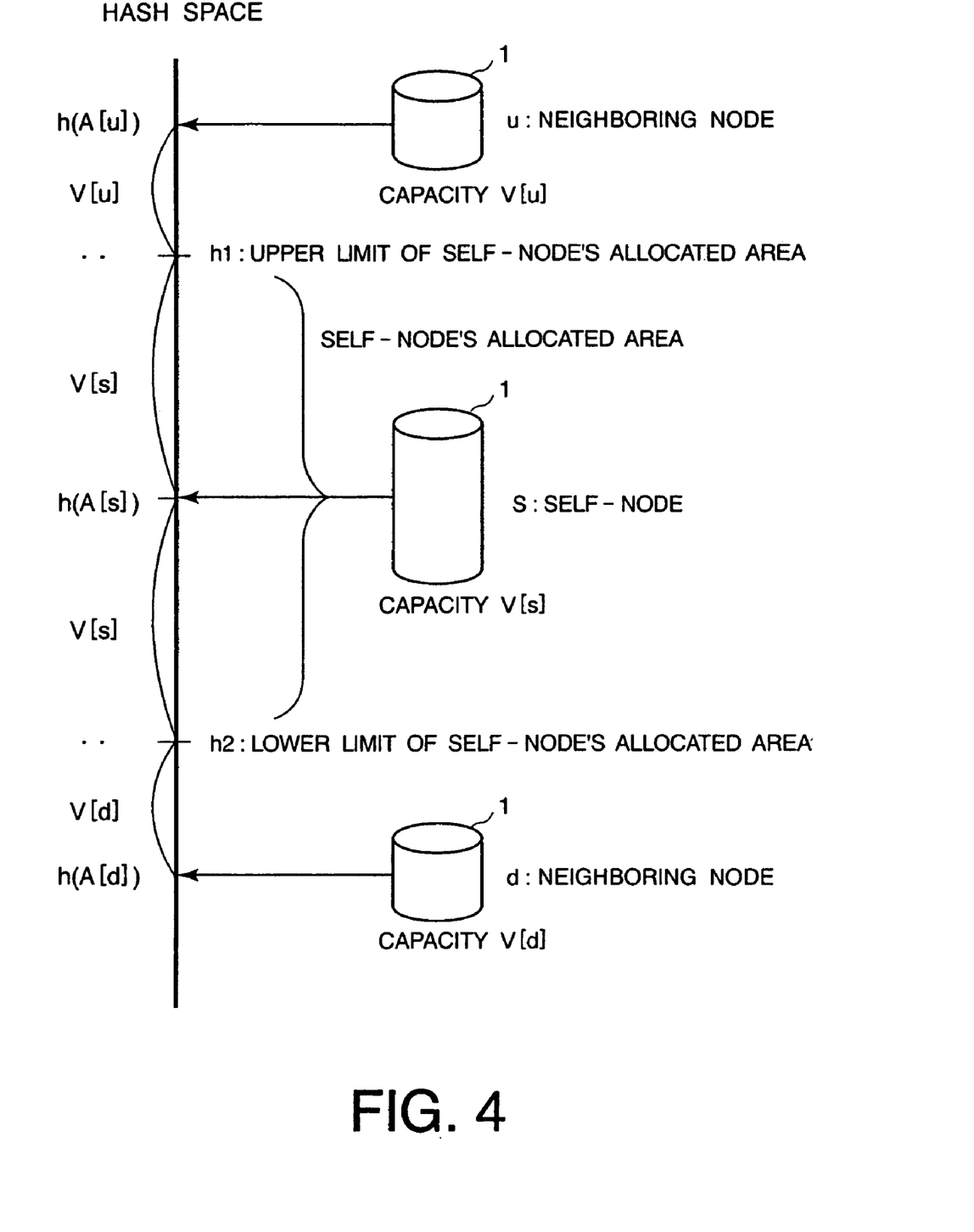
FIG. 4 is a schematic diagram of an area allocation method of hash space according to the present invention.

FIG. 4 shows a relationship of the above equation. Another boundary point $h_2$ between the self-node s and the other neighboring node d is represented by the same equation. Assume that the address of the other neighboring node d is A[d] and the weight of the other neighboring node d is V[d]. A relative space width W' is represented as follows.

$$W' = V[s]/(V[s] + V[d])$$

Another boundary point $h_2$ between the self-node s and the other neighboring node d is represented as follows.

$$h_2 = h(A[d]) * W' + h(A[s]) * (1-W')$$

$$h_2 - h(A[d]) : h(A[s]) - h_2 = V[d] : V[s]$$

In this way, the boundary point $h_1$ for one neighboring node u and the boundary point $h_2$ for the other neighboring node d are determined. The area between the two boundary points $h_1$ and $h_2$ is stored as the self-node's allocated area in the space assignment memory unit 13.

In the case that the hash space includes both side edges, as for two storage nodes taking charge of both edge parts of the hash space, a boundary point between each of the two storage nodes and the neighboring storage node is determined by above-mentioned method. An area between the boundary point and the edge point of self-node side of each of the two storage nodes is regarded as the self-node's allocated area.

Figure 5:
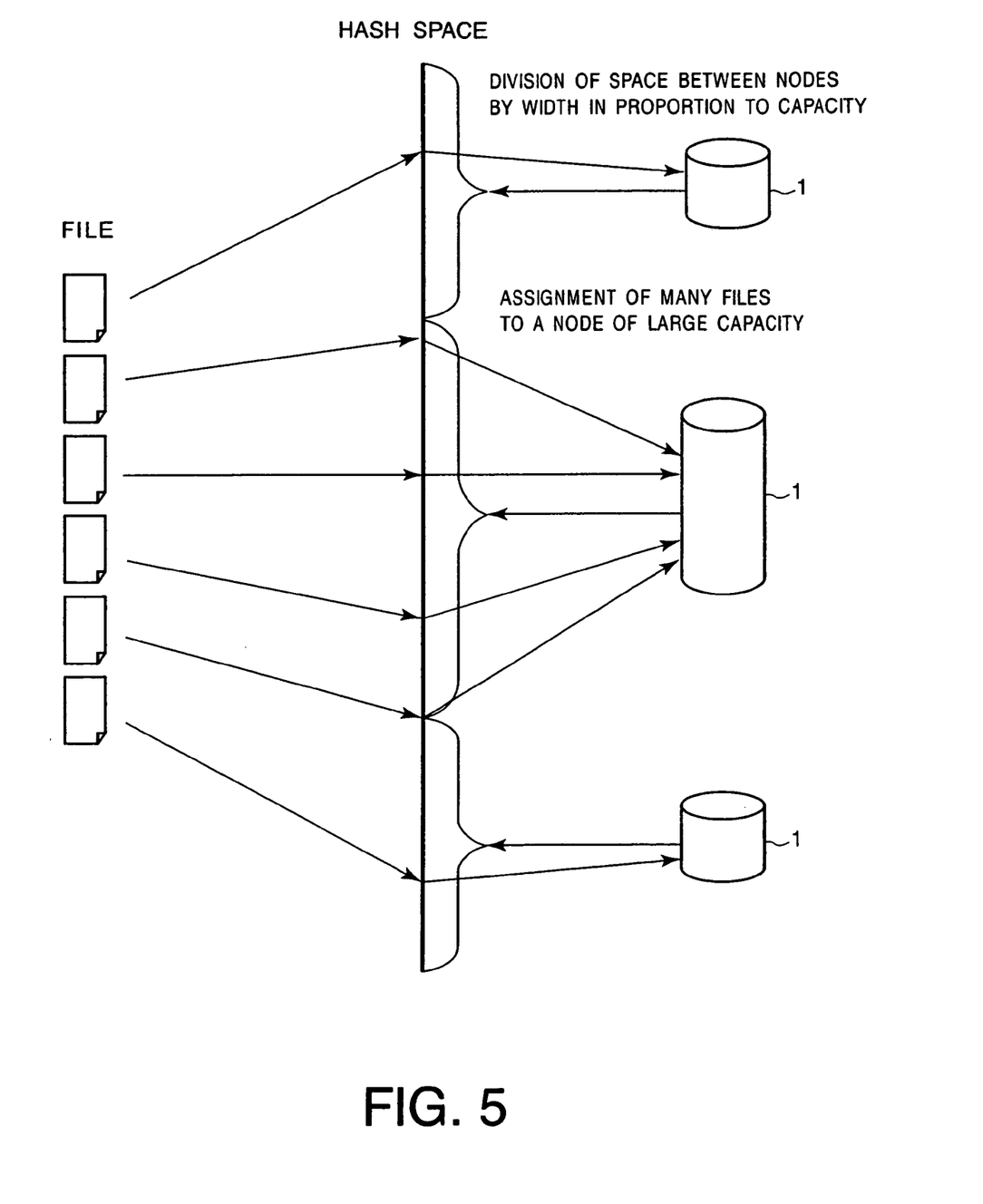
FIG. 5 is a schematic diagram of the area allocation method of hash space according to a first embodiment of the present invention.

In this way, an area between neighboring nodes in the hash space is divided by the weight (For example, memory capacity) of each node (For example, the area is divided by a width in proportion to the weight). In this case, as shown in FIG. 5, many files are assigned to the storage node of large memory capacity.

In the above explanation, the space width decision unit 11 calculates the equation (1) and the space assignment control unit 12 calculates the equation (2). However, the following equation may be calculated instead of the equations (1) and (2).

$$h_1 = h(A[u]) * V[s]/(V[s] + V[u]) + h(A[s]) * (1 - V[s]/V[s] + V[u])$$

Furthermore, the calculation method of the space width decision unit 11 and the space assignment control unit 12 is one example. Various calculation methods can be utilized.

Figure 6:
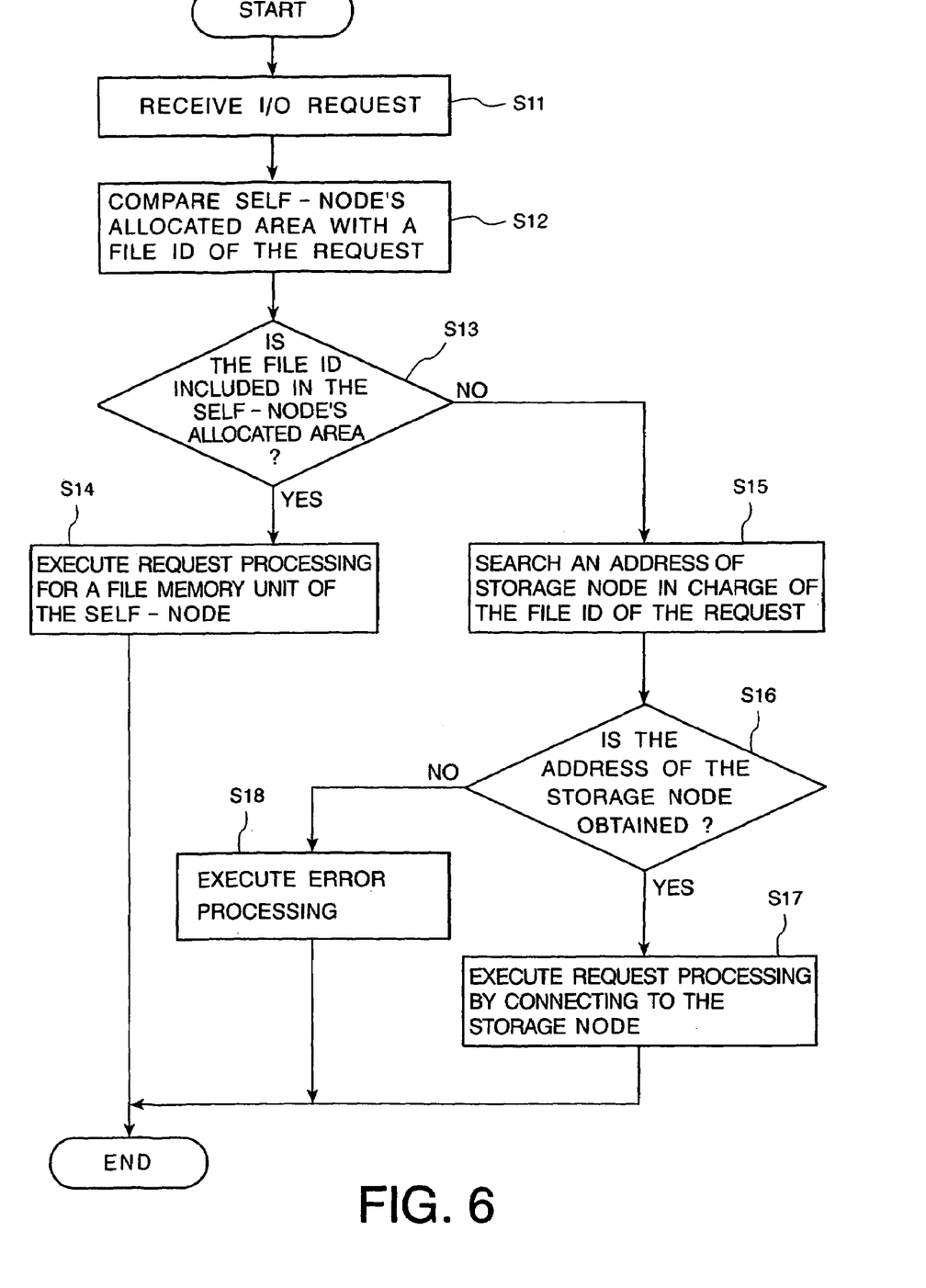
FIGS. 6 is a flow chart of processing of receiving I/O request for the storage node in the distributed storage system according to the present invention.

FIG. 6 is one example of processing of the storage node in the case of receiving I/O request according to the first embodiment. When the client computer 3 accesses a file on the distributed storage system, the client computer 3 sends an I/O request to the storage node 1 of the group of storage nodes taking charge of the file. In this case, the client computer can utilize arbitrary storage node 1 in the group of storage nodes. Practically, as shown in FIG. 1, the client computer 3 utilized the nearest storage node 1 on the network.

When the storage node 1 receives the I/O request (S11), the file input/output unit 14 compares the allocated area of the self-node (stored in the space assignment information memory unit 13) with a file ID (identifier) of the I/O request (S12). The file ID is a value applied the hash function to a file name or contents data of object file. If the file ID is included in the allocated area (S13), the file input/output unit 14 accesses the file memory unit 15 of the self-node and executes request processing (reading or writing the file) (S14). On the other hand, if the file ID is not included in the allocated area (S13), the file input/output unit 14 polls another node (the space assignment control unit) using an address of another node stored in the space assignment information memory unit 13 and searches an address of another storage node 1 taking change of the file ID (S15). If the address of another storage node 1 is obtained (S16), the file input/output unit 14 connects another storage node 1 (the file input/output unit) using the address and makes another storage node 1 execute the request processing (S17). If the address of the storage node 1 is not obtained (S16), the file input/output unit 14 executes error processing (S16). For example, an error message is replied to the client computer 3 of a request source. In this way, in the first embodiment, the space width of each storage node in the hash space is relatively determined based on the weight of the storage node. Accordingly, files are assigned in proportion to memory capacity of the storage node, and loads are distributed in proportion to the processing speed of the storage node.

The Second Embodiment

In the distributed storage system of the second embodiment, (each or a part of) the storage nodes composing one group of nodes are virtualized as a plurality of virtual nodes. A plurality of areas in the hash space is assigned to the storage node, and each file corresponding to the plurality of areas is stored in the storage node. Hereinafter, a specific point different from the first embodiment is mainly explained.

Figure 7:
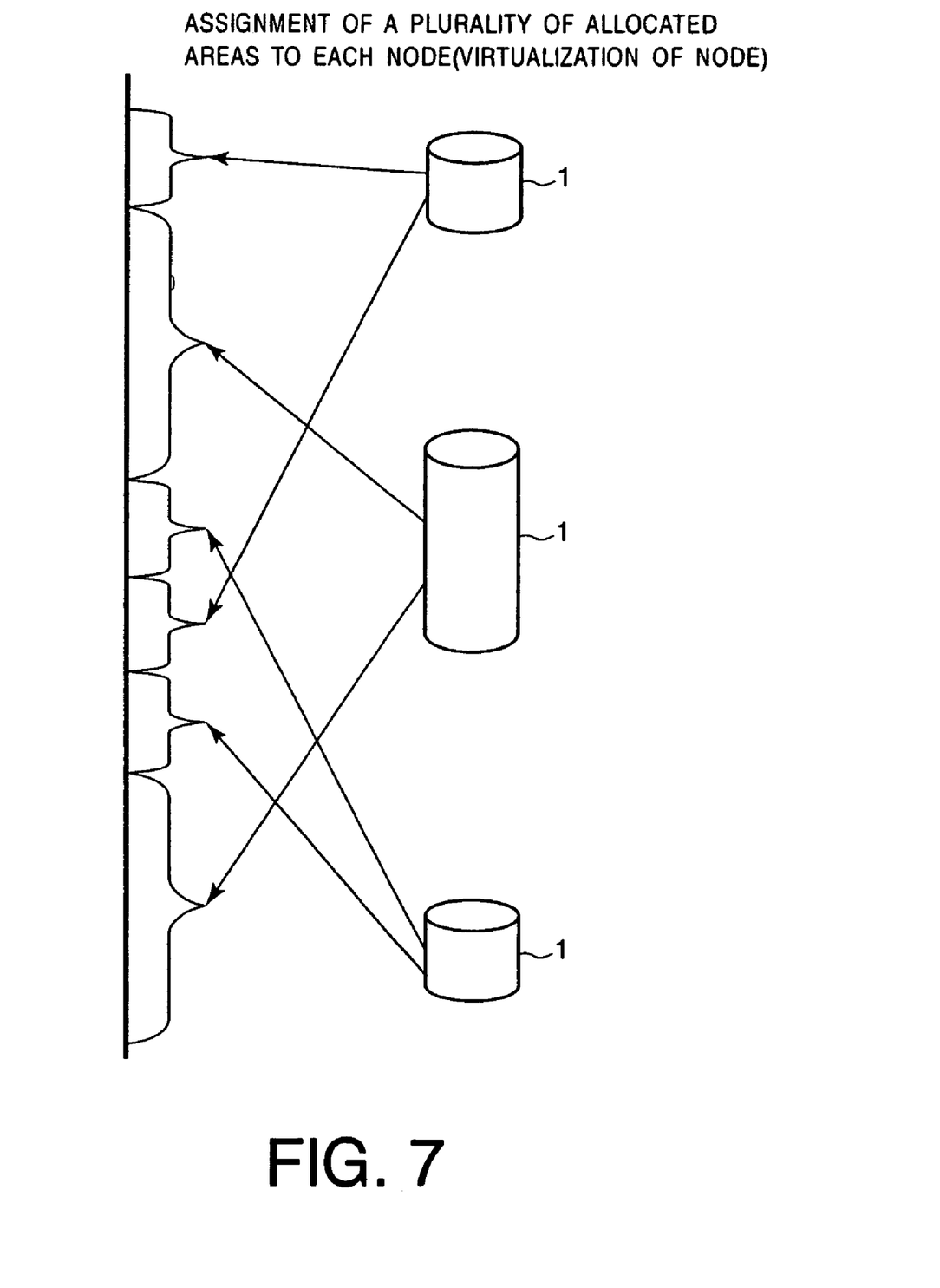
FIG. 7 is a schematic diagram of the area allocation method of hash space according to a second embodiment of the present invention.

FIG. 7 is a schematic diagram showing a division method of the hash space according to the second embodiment. In FIG. 1, each storage node 1 is called a physical node as a distinction from the virtual node. In the case of calculating a hash value from a node ID of each physical node 1, a virtual node number assigned to each physical node and an address of the physical node are used as an argument of the hash function. For example, assume that the address of the physical node s is A[s] and a number of virtual nodes set to the physical node s is v. The hash values of v units "h(A[s],0), . . . , h(A[s],v−1)" correspond to the physical node s. Each virtual node corresponding to the hash value is regarded as the storage node of the first embodiment. In the same way as in the first embodiment, the allocated area of each virtual node in the hash space is determined. In this case, a different weight may be assigned to each virtual node or the same weight may be commonly assigned to all virtual nodes.

In the second embodiment, in addition to a merit of the first embodiment, a plurality of allocated areas are assigned to the physical node and each physical node virtually neighbors a larger number of (a plurality of) other physical nodes. Accordingly, an average value of weights of neighboring nodes closely resembles an average value of weights of all nodes, and a space width allocated by each node in the hash space is correctly in proportion to the weight of each node. This is different from the prior art as a virtualization without the weight (distribution of distance between nodes in the hash space is small). This effect of the second embodiment is specially obtained by the combination of a virtualization and a space division based on the weight.

The Third Embodiment

In the distributed storage system of the third embodiment, the hash space is overlapping assigned to a plurality of nodes and the same file is overlapping assigned to the plurality of nodes. Hereinafter, a specific feature different from the first embodiment is mainly explained.

Figure 8:
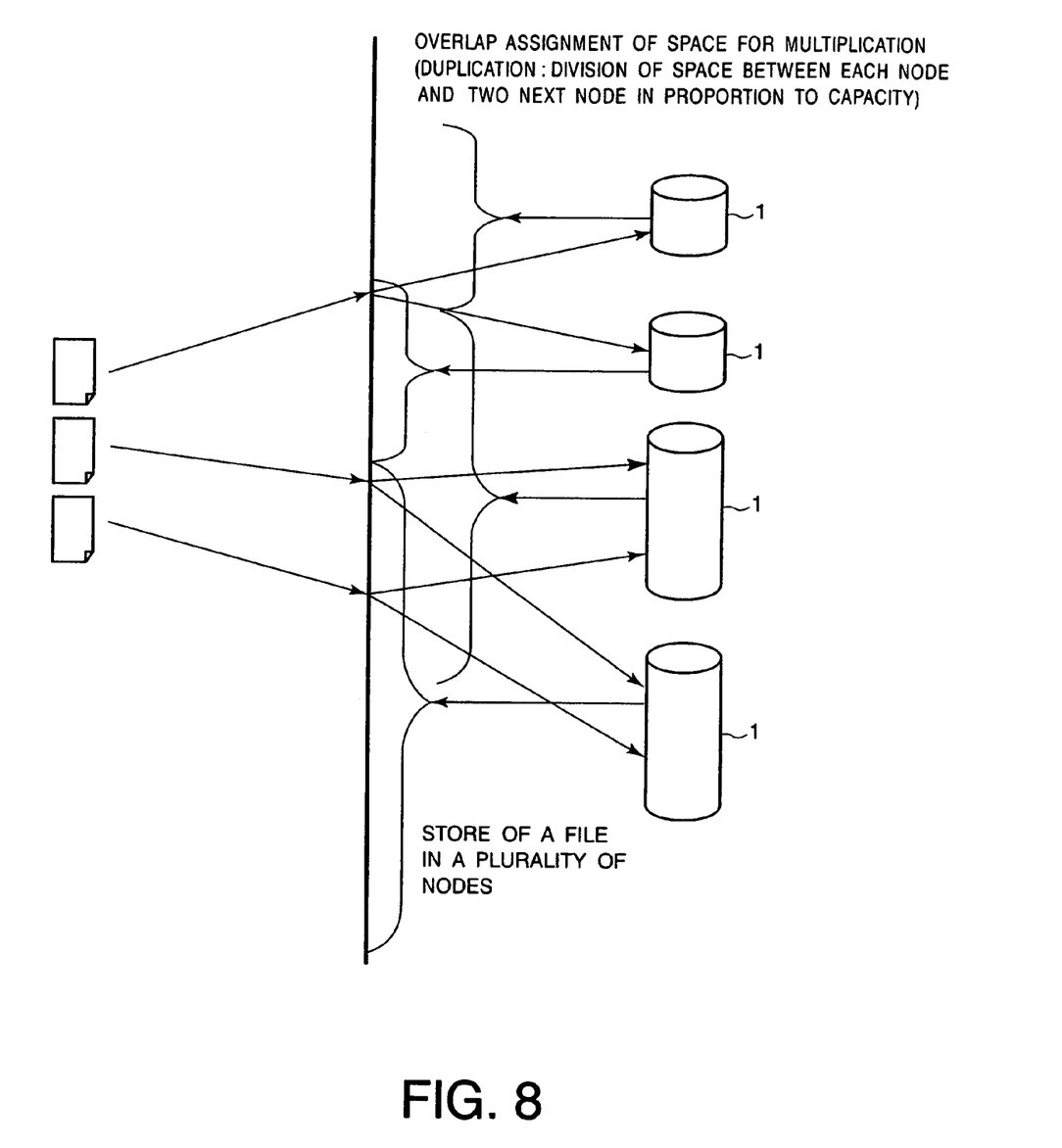
FIG. 8 is a schematic diagram of the area allocation method of hash space according to a third embodiment of the present invention.

FIG. 8 is a schematic diagram showing a division method of the hash space according to the third embodiment. In FIG. 8, the division method of duplication (n=2) is shown. In the case that the same point in the hash space is overlapping assigned to nodes of n units, all storage nodes are divided into n groups (n-division). The same hash space is regarded as object for each group. In the same way as in the first embodiment, the allocated area of each storage node of each group is determined. In this case, for example, instead of neighboring node of the first embodiment, an area between self-node and n units next node in the hash space is divided into two areas. Other storage nodes ((n−2) units) between the self-node and the n units next node similarly allocates each area in the hash space. As a result, the same point in the hash space is overlappedly assigned to nodes of n units.

As to multiplication, various methods for matching the file with a plurality of nodes are considered. For example, by respectively applying a plurality of hash functions to a file, a plurality of virtual file IDs are assigned to the file and the file is respectively stored in a plurality of nodes, each node ID corresponding to each of the plurality of virtual file IDs. This is one redundanzation method. However, if one storage node is removed by an accident or other occurrence, another storage node neighboring the one storage node in the hash space takes over the allocated area of the one storage node. In this method, any of the plurality of nodes except for the one storage node must transfer the file of the allocated area to another storage node. On the other hand, in the third embodiment, the same file is overlapping assigned to a plurality of neighboring storage nodes in the hash space. Accordingly, the neighboring storage node can take over the allocated area of the self-node and a transfer quantity of the file can be minimized.

In the third embodiment, in addition to the merits of the first embodiment, the same file is stored in a plurality of nodes of which node IP neighbor. Accordingly, a possibility that the file is deleted by an accident reduces. Furthermore, in the case of an accident or other occurrence, another node neighbored one node can take over the allocated area of the one node by minimizing the transfer quantity of the file of the allocated area.

Furthermore, the second embodiment and the third embodiment may be combined and put into operation.

In above explanation, in the case of storing a file in the storage node, the file is stored by a unit of file. However, the file may be divided into blocks and stored by block units. In this case, for example, a pair of a file name and a block number is used as a block name. By using the block name, above-mentioned method can be applied to the unit of block.

In the present invention, in the case that each storage node composing the distributed storage system allocates an area in the ID space as an object of the distributed storage system, the area can be effectively determined based on the weight of each storage node.

For embodiments of the present invention, the processing of the present invention can be accomplished by a computer-executable program, and this program can be realized in a computer-readable memory device.

In embodiments of the present invention, the memory device, such as a magnetic disk, a floppy disk, a hard disk, an optical disk (CD-ROM, CD-R, DVD, and so on), an optical magnetic disk (MD and so on) can be used to store instructions for causing a processor or a computer to perform the processes described above.

Furthermore, based on an indication of the program installed from the memory device to the computer, OS (operation system) operating on the computer, or MW (middle ware software), such as database management software or network, may execute one part of each processing to realize the embodiments.

Furthermore, the memory device is not limited to a device independent from the computer. By downloading a program transmitted through a LAN or the Internet, a memory device in which the program is stored is included. Furthermore, the memory device is not limited to one. In the case that the processing of the embodiments is executed by a plurality of memory devices, a plurality of memory devices may be included in the memory device. The component of the device may be arbitrarily composed.

In embodiments of the present invention, the computer executes each processing stage of the embodiments according to the program stored in the memory device. The computer may be one apparatus such as a personal computer or a system in which a plurality of processing apparatuses are connected through a network. Furthermore, in the present invention, the computer is not limited to a personal computer. Those skilled in the art will appreciate that a computer includes a processing unit in an information processor, a microcomputer, and so on. In short, the equipment and the apparatus that can execute the functions in embodiments of the present invention using the program are generally called the computer.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A storage apparatus used in a distributed storage system, comprising:
    a file memory to store data corresponding to identifiers of an allocated area in an identifier space;
    a first memory to store a basis position of the allocated area in the identifier space;
    a second memory to store a weight of the storage apparatus as a performance degree, the weight being calculated by at least one of storage capacity, calculation ability, and circuit speed of the storage apparatus;
    a first decision unit configured to calculate a sum of the weight of the storage apparatus and a weight of another storage apparatus, to divide the weight of the storage apparatus by the sum, and to set the division result as a space width to divisionally allocate the identifier space with the another storage apparatus, the another storage apparatus allocating a neighboring area of the allocated area in the identifier space; and
    a second decision unit configured to multiply a value of the basis position of the storage apparatus with a subtraction value of the space width from one as a first multiplication value, to multiply a value of the basis position of the another storage apparatus with the space width as a second multiplication value, to calculate a sum of the first multiplication value and the second multiplication value, and to set an area between a position of the sum and the basis position of the storage apparatus in the identifier space as the allocated area.

2. A storage apparatus used in a distributed storage system, comprising:
    a file memory to store data corresponding to identifiers of an allocated area in an identifier space;

a first memory to store a basis position of the allocated area in the identifier space;
a second memory to store a weight of the storage apparatus as a performance degree, the weight being calculated by at least one of storage capacity, calculation ability, and circuit speed of the storage apparatus;
a first decision unit configured to decide a space width to divisionally allocate the identifier space with another storage apparatus by using the weight and a weight of the another storage apparatus, the another storage apparatus allocating a neighboring area of the allocated area in the identifier space; and
a second decision unit configured to decide the allocated area of an area between the basis position and a basis position of the neighboring area in the identifier space by using the space width,
wherein the basis position of the another storage apparatus is nearest to the basis position of the storage apparatus in other storage apparatuses each of which has a different basis position in the identifier space,
wherein the another storage apparatus is regarded as a neighboring storage apparatus, and
wherein, if a basis position of a first neighboring storage apparatus exists on one side of the basis position of the storage apparatus and a basis position of a second neighboring storage apparatus exists on the other side of the basis position of the storage apparatus in the identifier space,
said second decision unit decides a first allocated area for the first neighboring storage apparatus and a second allocated area for the second neighboring storage apparatus, and sets a merger area of the first allocated area and the second allocated area as the allocated area.

3. A storage apparatus used in a distributed storage system, comprising:
a file memory to store data corresponding to identifiers of an allocated area in an identifier space;
a first memory to store a basis position of the allocated area in the identifier space;
a second memory to store a weight of the storage apparatus as a performance degree, the weight being calculated by at least one of storage capacity, calculation ability, and circuit speed of the storage apparatus;
a first decision unit configured to decide a space width to divisionally allocate the identifier space with another storage apparatus by using the weight and a weight of the another storage apparatus, the another storage apparatus allocating a neighboring area of the allocated area in the identifier space; and
a second decision unit configured to decide the allocated area of an area between the basis position and a basis position of the neighboring area in the identifier space by using the space width,
wherein the basis position of the another storage apparatus is nearest to the basis position of the storage apparatus in other storage apparatuses each of which has a different basis position in the identifier space,
wherein the another storage apparatus is regarded as a neighboring storage apparatus, and
wherein, if a basis position of the neighboring storage apparatus exists on one side of the basis position of the storage apparatus and all basis positions of other storage apparatuses do not exist on the other side of the basis position of the storage apparatus in the identifier space,
said second decision unit decides a first allocated area for the neighboring storage apparatus, decides a second allocated area between the basis position of the storage apparatus and an edge position of the other side in the identifier space, and sets a merger area of the first allocated area and the second allocated area as the allocated area.

4. A storage apparatus used in a distributed storage system, comprising:
a file memory to store data corresponding to identifiers of an allocated area in an identifier space;
a first memory to store a basis position of the allocated area in the identifier space;
a second memory to store a weight of the storage apparatus as a performance degree, the weight being calculated by at least one of storage capacity, calculation ability, and circuit speed of the storage apparatus;
a first decision unit configured to decide a space width to divisionally allocate the identifier space with another storage apparatus by using the weight and a weight of the another storage apparatus, the another storage apparatus allocating a neighboring area of the allocated area in the identifier space;
a second decision unit configured to decide the allocated area of an area between the basis position and a basis position of the neighboring area in the identifier space by using the space width; and
a third memory to store an address of the storage apparatus,
wherein the basis position of the storage apparatus is calculated by applying a hash function to the address,
wherein the basis position of the another storage apparatus is nearest to the basis position of the storage apparatus in other storage apparatuses each of which has a different basis position in the identifier space, and
wherein the another storage apparatus is regarded as a neighboring storage apparatus.

5. The storage apparatus according to claim 4, further comprising:
an acquirement unit configured to acquire an address of the neighboring storage apparatus, and
a fourth memory to store the address of the neighboring storage apparatus.

6. The storage apparatus according to claim 5
wherein a basis position of the neighboring storage apparatus is calculated by applying the hash function to the address of the neighboring storage apparatus.

7. The storage apparatus according to claim 6
wherein said acquirement unit calculates a first sum of the basis position of the storage apparatus and $2^{b-1}$ (b: predetermined integral number), calculates a second sum of the basis position of the neighboring storage apparatus and $2^{b-1}$, and acquires addresses of other storage apparatuses each allocating an area of the first sum or an area of the second sum in the identifier space, and
wherein said fourth memory stores the addresses.

8. A storage apparatus used in a distributed storage system, comprising:
a file memory to store data corresponding to identifiers of an allocated area in an identifier space;
a first memory to store a basis position of the allocated area in the identifier space;
a second memory to store a weight of the storage apparatus as a performance degree, the weight being calculated by at least one of storage capacity, calculation ability, and circuit speed of the storage apparatus;
a first decision unit configured to decide a space width to divisionally allocate the identifier space with another storage apparatus by using the weight and a weight of the another storage apparatus, the another storage apparatus allocating a neighboring area of the allocated area in the identifier space; and a second decision unit configured to decide the allocated area of an area between the basis position and a basis position of the neighboring area in the identifier space by using the space width, wherein the storage apparatus corresponds to a plurality of virtual nodes each of which has a different basis position in the identifier space, the basis position of each virtual node being calculated by applying the hash function to a multiplication value of the address of the storage apparatus with an identifier of each virtual node, and wherein said second decision unit respectively decides the allocated area of each of the plurality of virtual nodes.

9. A storage apparatus used in a distributed storage system, comprising:

a file memory to store data corresponding to identifiers of an allocated area in an identifier space;

a first memory to store a basis position of the allocated area in the identifier space;

a second memory to store a weight of the storage apparatus as a performance degree, the weight being calculated by at least one of storage capacity, calculation ability, and circuit speed of the storage apparatus;

a first decision unit configured to decide a space width to divisionally allocate the identifier space with another storage apparatus by using the weight and a weight of the another storage apparatus, the another storage apparatus allocating a neighboring area of the allocated area in the identifier space; and a second decision unit configured to decide the allocated area of an area between the basis position and a basis position of the neighboring area in the identifier space by using the space width, wherein the storage apparatus corresponds to a plurality of virtual node each of which has a different basis position in the identifier space and a different weight previously assigned, and wherein said second decision unit respectively decides the allocated area of each of the plurality of virtual nodes.

* * * * *